(12) United States Patent
El-Baz

(10) Patent No.: US 9,014,456 B2
(45) Date of Patent: Apr. 21, 2015

(54) COMPUTER AIDED DIAGNOSTIC SYSTEM INCORPORATING APPEARANCE ANALYSIS FOR DIAGNOSING MALIGNANT LUNG NODULES

(75) Inventor: Ayman S. El-Baz, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 22 days.

(21) Appl. No.: 13/368,977

(22) Filed: Feb. 8, 2012

(65) Prior Publication Data

US 2012/0201445 A1    Aug. 9, 2012

Related U.S. Application Data

(60) Provisional application No. 61/440,615, filed on Feb. 8, 2011.

(51) Int. Cl.
*G06K 9/00*    (2006.01)
*G06T 7/00*    (2006.01)
*G06K 9/62*    (2006.01)

(52) U.S. Cl.
CPC .............. *G06T 7/0014* (2013.01); *G06K 9/621* (2013.01); *G06K 9/6297* (2013.01); *G06K 2209/051* (2013.01); *G06T 2207/10081* (2013.01); *G06T 2207/20081* (2013.01); *G06T 2207/30064* (2013.01)

(58) Field of Classification Search
None
See application file for complete search history.

(56) References Cited

U.S. PATENT DOCUMENTS

| | | | | |
|---|---|---|---|---|
| 5,982,917 | A * | 11/1999 | Clarke et al. | 382/132 |
| 6,728,334 | B1 * | 4/2004 | Zhao | 378/62 |
| 7,209,581 | B2 * | 4/2007 | Zhang et al. | 382/131 |
| 2004/0101176 | A1 * | 5/2004 | Mendonca et al. | 382/128 |
| 2004/0252870 | A1 * | 12/2004 | Reeves et al. | 382/128 |
| 2004/0264627 | A1 * | 12/2004 | Besson | 378/5 |
| 2005/0105788 | A1 * | 5/2005 | Turek et al. | 382/131 |
| 2005/0207630 | A1 * | 9/2005 | Chan et al. | 382/131 |
| 2006/0018524 | A1 * | 1/2006 | Suzuki et al. | 382/128 |
| 2008/0002870 | A1 * | 1/2008 | Farag et al. | 382/128 |
| 2008/0144909 | A1 * | 6/2008 | Wiemker et al. | 382/131 |

(Continued)

FOREIGN PATENT DOCUMENTS

WO    WO 2010001127 A1 *    1/2010

OTHER PUBLICATIONS

A. El-Baz, G.Gimel'farb, R. Falk, M. Abo El-Ghar. "Automatic analysis of 3D low dose CT images for early diagnosis of lung cancer" Elsevier, Pattern Recognition 42. 2009.*

(Continued)

*Primary Examiner* — Jon Chang
*Assistant Examiner* — Oneal R Mistry
(74) *Attorney, Agent, or Firm* — Wood, Herron & Evans, LLP

(57) ABSTRACT

A computer aided diagnostic system and automated method diagnose lung cancer through modeling and analyzing the visual appearance of pulmonary nodules. A learned appearance model used in such analysis describes the appearance of pulmonary nodules in terms of voxel-wise conditional Gibbs energies for a generic rotation and translation invariant second-order Markov-Gibbs random field (MGRF) model of malignant nodules with analytically estimated characteristic voxel neighborhoods and potentials.

15 Claims, 10 Drawing Sheets

(56) References Cited

U.S. PATENT DOCUMENTS

| | | | |
|---|---|---|---|
| 2009/0129673 A1* | 5/2009 | Simon et al. | 382/173 |
| 2010/0111386 A1* | 5/2010 | El-Baz | 382/128 |
| 2010/0198053 A1* | 8/2010 | Miyazaki et al. | 600/419 |
| 2011/0142301 A1* | 6/2011 | Boroczky et al. | 382/128 |
| 2011/0268338 A1* | 11/2011 | Collins et al. | 382/131 |

OTHER PUBLICATIONS

Shiying Hu, Eric A Hoffman, Joseph Reinhardt. "Automatic Lung Segmentation for Accurate Quantitation of Volumentic X-Ray CT images" IEEE, 20, No. 6. Jun. 2011.*

R. Wiemker, P Rogalla, T Blaffert, D SifRi, O Hay, E Shah, R Truyen, and F Fleiter. "Aspects of Computer-aided detection (CAD) and volumetry of pulmonary nodules suing multislice CT" The bristh Journal of Radiology, 78. 2005.*

El-Baz et al. "Toward Early Diagnosis of Lung Cancer" Springer-Verlag Berlin Heidelberg, LNCS 5762, pp. 682-689, 2009, hereinafter El-Baz.*

Lashkari et al (NPL "Nonparametric Hierarchical Bayesian Model for Functional Brain Parcellation", NIH Public Access, Conf. Computer Vis. Pattern Recognition Workshop, 1-19, 2010, hereafter referred to as Lashkari).*

* cited by examiner

COMPUTER AIDED DIAGNOSTIC SYSTEM INCORPORATING APPEARANCE ANALYSIS FOR DIAGNOSING MALIGNANT LUNG NODULES

CROSS-REFERENCE TO RELATED APPLICATIONS

This application claims priority to U.S. Provisional Application Ser. No. 61/440,615 filed by Ayman S. El-Baz on Feb. 8, 2011, and entitled "COMPUTER AIDED DIAGNOSTIC SYSTEM INCORPORATING APPEARANCE ANALYSIS FOR DIAGNOSING MALIGNANT LUNG NODULES," which application is incorporated by reference in its entirety.

FIELD OF THE INVENTION

The invention is generally related to computer analysis of medical image data, and in particular to the detection of malignant lung nodules in medial image data, e.g., low dose computed tomography (LDCT) chest scans.

BACKGROUND OF THE INVENTION

Lung cancer remains the leading cause of mortality cancer. In 1999, there were approximately 170,000 new cases of lung cancer in the U.S., where approximately one in every eighteen women and approximately one in every twelve men develop lung cancer. Lung tumors (visible on chest film as pulmonary nodules) are the most common manifestation of lung cancer being the principal cause of cancer-related deaths. A pulmonary nodule is an approximately spherical volume of higher density tissue being visible in an X-ray lung image, and early detection of pulmonary nodules may increase the patient's chance of survival. Detecting pulmonary nodules, however, is a complicated task. Nodules typically show up in an X-ray lung image as relatively low-contrast white circular objects within the lung fields. The difficulty for computer aided image data search schemes is distinguishing true nodules from (overlapping) shadows, vessels and ribs.

The early stage detection of lung cancer therefore remains an important goal in medical research. Regular chest radiography and sputum examination programs have proven ineffective in reducing mortality rates. Although screening for lung cancer with chest X-rays can detect early lung cancer, such screening can also possibly produce many false-positive test results, causing needless extra tests. Furthermore, while large (e.g., greater than 1 cm in diameter) malignant nodules are often relatively easy to detect with conventional screening equipment and can be diagnosed with needle biopsy or bronchoscopy techniques, these techniques are typically unsuitable for detecting smaller nodules, particularly if such nodules are located deep in the lung tissue or away from large airways. Thus, many of these techniques have been found to be unsuitable for early stage lung cancer detection.

At present, low-dose spiral computed tomography (LDCT) is of prime interest for screening (high risk) groups for early detection of lung cancer and is being studied by various groups, including the National Cancer Institute. LDCT provides chest scans with very high spatial, temporal, and contrast resolution of anatomic structures and is able to gather a complete 3D volume of a human thorax in a single breathhold. Hence, for these reasons, in recent years most lung cancer screening programs are being investigated in the United States and Japan with LDCT as the screening modality of choice.

Automatic screening of image data from LDCT typically involves selecting initial candidate lung abnormalities (pulmonary nodules). Next, the false candidates, called false positive nodules (FPNs), are partially eliminated while preserving the true positive nodules (TPNs).

When selecting initial candidates, conformal nodule filtering or unsharp masking can enhance nodules and suppress other structures to separate the candidates from the background by simple thresholding or multiple gray-level thresholding techniques. A series of 3D cylindrical and spherical filters may be used to detect small lung nodules from high resolution CT images. Circular and semicircular nodule candidates may be detected by template matching. However, these spherical, cylindrical, or circular assumptions are typically not adequate for describing the general geometry of the lesions. This is because their shape can be irregular due to the spiculation or the attachments to the pleural surface (i.e., juxtapleural and peripheral) and vessels (i.e., vascularized). Morphological operators may be used to detect lung nodules. The drawbacks to these approaches are the difficulties in detecting lung wall nodules. Also, there are other pattern recognition techniques used in detection of lung nodules such as clustering, linear discriminant functions, rule-based classification, Hough transforms, connected component analysis of thresholded CT slices, gray level distance transforms, and patient-specific a priori models.

FPNs may be excluded by feature extraction and classification. Such features as circularity, size, contrast, or local curvature that are extracted by morphological techniques, or artificial neural networks (ANN), may be used as post-classifiers. Also, there are a number of classification techniques used in the final stage of some nodule detection systems to reduce the FPNs such as: rule-based or linear classifiers; template matching; nearest cluster; and Markov random field.

One of the most popular and promising directions of detecting small cancerous nodules is to analyze their changes over time. For example, attempts have been made to classify nodules as benign or malignant by estimating their growth rate. Tracking temporal nodule behavior is a challenging task, however, because of changes in the patient's position at each data acquisition, as well as effects of heart beats and respiration. In order to accurately measure how the nodules are developing in time, all of these motions need to be compensated by registering the LDCT data sets taken at different times. Several methods have been proposed for solving medical image registration problems and excluding the lung motions; however, the accuracy of nodule classification based on the growth rate still remains below clinical requirements.

Therefore, a need continues to exist in the art for an improved image processing techniques for use in diagnosing malignant pulmonary nodules.

SUMMARY OF THE INVENTION

The invention addresses these and other problems associated with the prior art by providing a computer aided diagnostic system and automated method for diagnosing lung cancer through modeling and analyzing the visual appearance of pulmonary nodules. Embodiments consistent with the invention may utilize a learned appearance model that describes the appearance of pulmonary nodules in terms of voxel-wise conditional Gibbs energies for a generic rotation and translation invariant second-order Markov-Gibbs random field (MGRF) model of malignant nodules with analytically estimated characteristic voxel neighborhoods and potentials.

Consistent with one aspect of the invention, therefore, a method of classifying a pulmonary nodule includes receiving image data associated with a chest scan; segmenting image data associated with lung tissue from the image data associated with the chest scan; equalizing the segmented image data; segmenting image data associated with a pulmonary nodule from the equalized and segmented image data; and classifying the pulmonary nodule as benign or malignant by applying a learned appearance model to the segmented image data associated with the pulmonary nodule. The learned appearance model is based upon visual appearances of a plurality of known pulmonary nodules.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 2A is an exemplary LDCT image, while

FIG. 6A illustrates selected typical cross-sections of training malignant pulmonary nodules, while

FIGS. 8A, 8B and 8C illustrate original LDCT images taken in axial, saggital and coronal planes, FIGS. 8D, 8E and 8F illustrate nodule segmentation performed on the images of FIGS. 8A, 8B and 8C, and FIGS. 8G, 8H and 8I illustrate application of a learned appearance model to the images of FIGS. 8D, 8E and 8F.

FIGS. 9A, 9B and 9C illustrate original LDCT images taken in axial, saggital and coronal planes, FIGS. 9D, 9E and 9F illustrate nodule segmentation performed on the images of FIGS. 9A, 9B and 9C, and FIGS. 9G, 9H and 9I illustrate application of a learned appearance model to the images of FIGS. 9D, 9E and 9F.

DETAILED DESCRIPTION

Embodiments consistent with the invention provide for automated diagnosis of lung cancer principally through characterizing pulmonary nodules through modeling and analyzing their visual appearance, and typically without requiring image registration. The appearance is described in terms of voxel-wise conditional Gibbs energies for a generic rotation and translation invariant second-order MGRF model of malignant nodules with analytically estimated characteristic voxel neighborhoods and potentials. Further details regarding the techniques described herein are provided in A. El-Baz, G. Gimel'farb, R. Falk, M El-Ghar "APPEARANCE ANALYSIS FOR DIAGNOSING MALIGNANT LUNG NODULES," Proc. Of the 2010 IEEE International Conference on Biomedical Imaging: from Nano to Macro, Rotterdam, NL, Apr. 14-17, 2010, pp. 193-196, which is incorporated by reference in its entirety.

Figure 1:
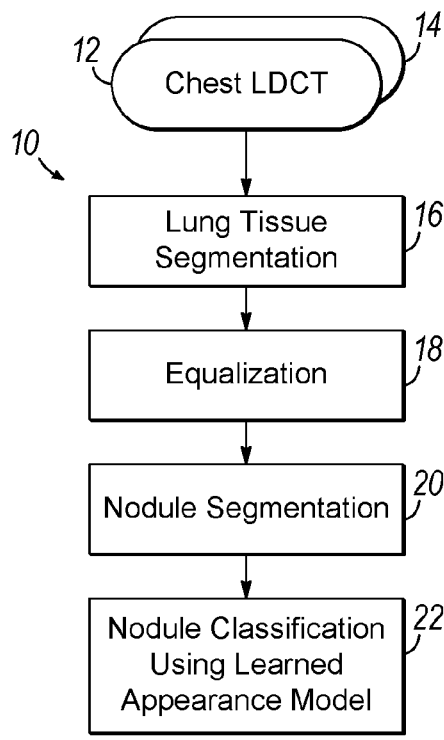
FIG. 1 is a flowchart of an automated lung cancer diagnostic process consistent with the invention.

Now turning to the Drawings, wherein like numbers denote like parts throughout the several views, FIG. 1 illustrates an exemplary automated process 10 for appearance model-based diagnosis of lung cancer consistent with the invention. Process 10 in particular is based upon the diagnosis of lung cancer via the application of a learned appearance model of for pulmonary nodules to low dose CT (LDCT) images. Process 10 receives as input one or more LDCT chest scans 12, 14, and begins by segmenting lung tissues from the LDCT chest scans. A chest scan, within the context of the invention, typically includes one or more two dimensional "slices" of image data generated from a medical imaging device such as a CT scanner, an MRI imager, or other medical imaging device.

Figure 2A:
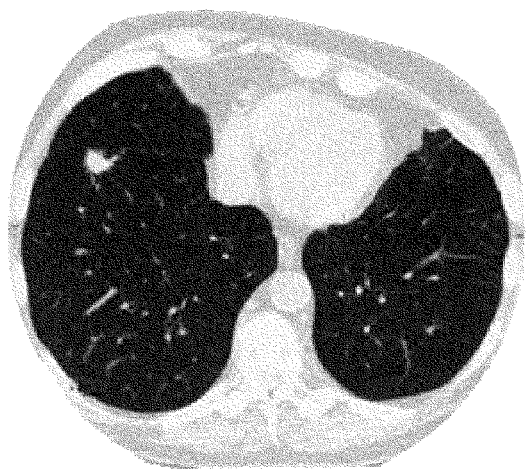
Figure 2B:
FIGS. 2B-2D illustrate various operations performed on such image by the process of FIG. 1.

In particular, referring also to FIGS. 2A-2B, lung segmentation, e.g., as disclosed in A. El-Baz, G. Gimel'farb, R. Falk, M. Abou El-Ghar, Holland, and T. Shaffer, "A New Stochastic Framework for Accurate Lung Segmentation," Proc. of International Conference on Medical Image Computing and Computer-Assisted Intervention, New York, USA, Sep. 6-10, 2008, pp. 322-330, may be performed on an LDCT slice (FIG. 2A) to form segmented lung image data (FIG. 2B).

Figure 2C:
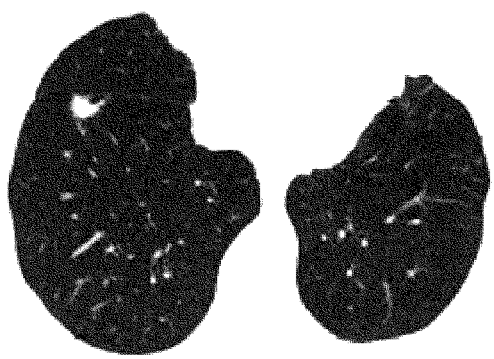

Returning to FIG. 1, once the lung tissue is segmented, the segmented lung image data may be equalized in line width in block 18, e.g., as disclosed in R. Gonzalez and R. Woods, Digital Image Processing, Addison-Wesley Publishing Company (New York), 1992, to form equalized lung image data 14. The equalization of the segmented image data in FIG. 2B, for example, is illustrated in FIG. 2C.

Figure 2D:
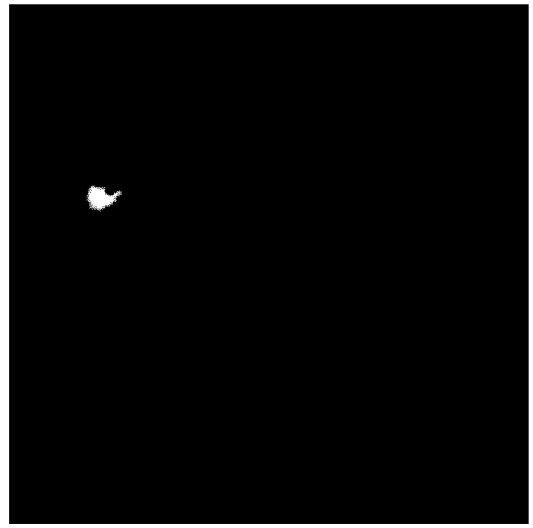

Returning again to FIG. 1, thereafter nodule segmentation may be performed in block 20, e.g., as disclosed in A. Farag, A. El-Baz, G. Gimel'farb, R. Falk, M. Abou El-Ghar, T. El-Diasty, and S. Elshazly, "Appearance Models for Robust Segmentation of Pulmonary Nodules in 3D LDCT Chest Images," Proc. of International Conference on Medical Image Computing and Computer-Assisted Intervention, Copenhagen, Denmark, Oct. 16, 2006, vol. 1, pp. 662-670, thereby segmenting the pulmonary nodule from the equalized lung image data to generate pulmonary nodule image data, as illustrated in FIG. 2D.

Returning yet again to FIG. 1, once a nodule has been segmented, a learned appearance model consistent with the invention is applied to the equalized image data in block 20. A detailed discussion of the generation of a learned appearance model consistent with the invention, and the results of applying such a model to pulmonary image data, is provided below.

Figure 3:
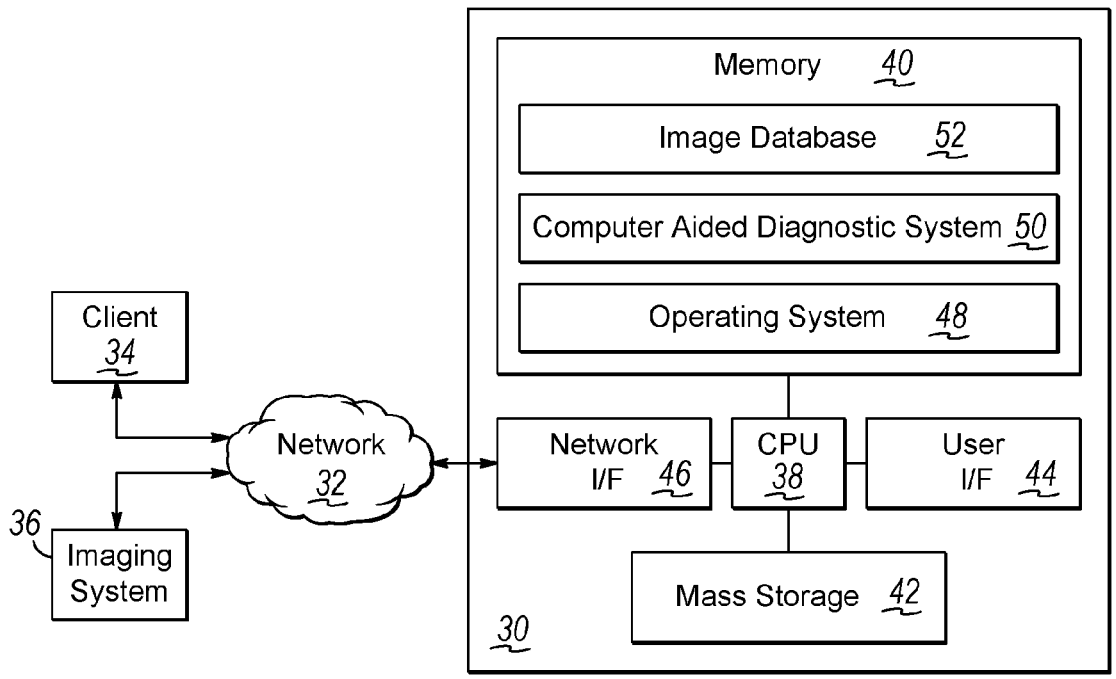
FIG. 3 is a block diagram of an exemplary apparatus suitable for implementing steps from the process of FIG. 1.

One or more steps in process 10 may be implemented in an automated fashion, utilizing a computer or other electronic device to implement such steps. FIG. 3, for example, illustrates an exemplary apparatus 30 within which various steps from process 10 may be implemented in a manner consistent with the invention. Apparatus 30 in the illustrated embodiment is implemented as a server or multi-user computer that is coupled via a network 32 to one or more client computers 34, as well as an imaging system 36, e.g., a helical or multi-slice LDCT scanner. For the purposes of the invention, each computer 30, 34 may represent practically any type of computer, computer system or other programmable electronic device. Moreover, each computer 30, 34 may be implemented using one or more networked computers, e.g., in a cluster or other distributed computing system. In the alternative, computer 30 may be implemented within a single computer or other programmable electronic device, e.g., a desktop computer, a laptop computer, a handheld computer, a cell phone, a set top box, etc.

Computer 30 typically includes a central processing unit 38 including at least one microprocessor coupled to a memory 40, which may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 40 may be considered to include memory storage physically located elsewhere in computer 30, e.g., any cache memory in a processor in CPU 38, as well as any storage capacity used as a virtual memory, e.g., as stored on a mass storage device 42 or on another computer coupled to computer 30. Computer 30 also typically receives a number of inputs and outputs for communicating information externally. For interface with a user or operator, computer 30 typically includes a user interface 44 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 30 may also include one or more mass storage devices 42, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface 46 with one or more networks 32 (e.g., a LAN, a WAN, a wireless network, and/or the Internet, among others) to permit the communication of information with other computers and electronic devices. It should be appreciated that computer 30 typically includes suitable analog and/or digital interfaces between CPU 36 and each of components 40, 42, 44 and 46 as is well known in the art. Other hardware environments are contemplated within the context of the invention.

Computer 30 operates under the control of an operating system 48 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 30 via network 32, e.g., in a distributed or client-server computing environment, whereby the processing required to implement the functions of a computer program may be allocated to multiple computers over a network.

As an example, computer 30 may include a computer aided diagnostic (CAD) system program 50 used to implement one or more of the steps described above in connection with process 10. For the purposes of implementing such steps, an image database 52, storing LDCT chest scan images, may be implemented in computer 30. It will be appreciated, however, that some steps in process 10 may be performed manually and with or without the use of computer 30.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable storage media include but are not limited to physical, tangible storage media such as volatile and non-volatile memory devices, floppy and other removable disks, hard disk drives, magnetic tape, optical disks (e.g., CD-ROMs, DVDs, etc.), among others.

In addition, various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Learned Appearance Model

As noted above, to assist in the detection and classification of malignant pulmonary nodules, as well as in some embodiments to exclude a pre-segmentation image alignment, the visual appearances of both small 2D and large 3D malignant lung nodules in an LDCT chest image may be modeled with a generic translation and rotation invariant second-order Markov-Gibbs random field (MGRF) model, hereinafter referred to as a learned appearance model, which may be applied to segmented and/or equalized pulmonary image data. As will become more apparent below, the voxel-wise and central-symmetric pairwise voxel potentials of such a model may account for differences between the Hounsfield values (i.e. gray levels, or intensities) of the nodules. Also, as noted above, possible monotone (order-preserving) intensity changes, e.g. due to different sensor characteristics, may be taken into account by equalizing lung areas on every segmented LDCT data set as shown in FIGS. 2A-2D (discussed above).

Figure 4A:
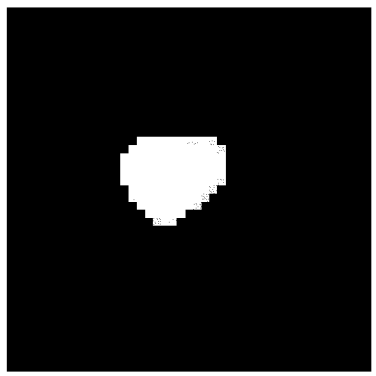
FIGS. 4A and 4B are 2D and 3D visualizations of Hounsfield values over an axial cross-section of a benign pulmonary nodule.
Figure 4B:
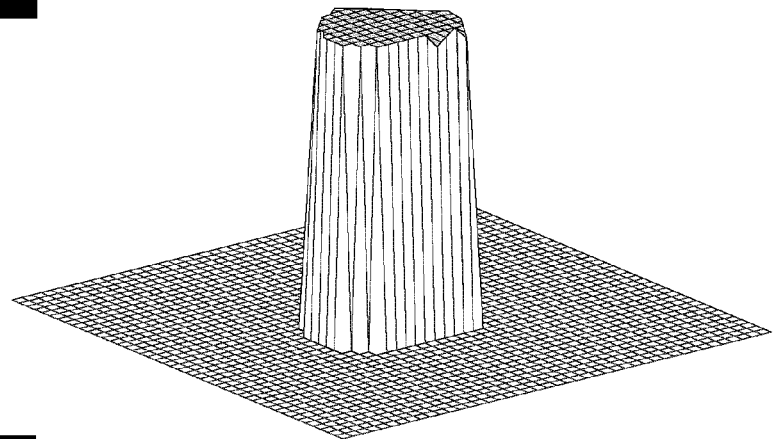
Figure 4C:
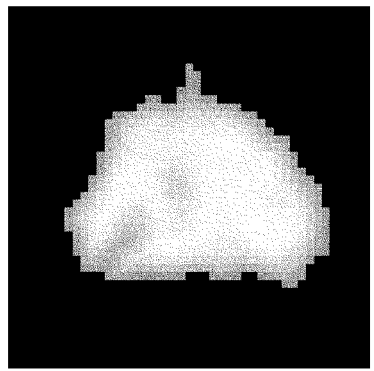
FIGS. 4C and 4D are 2D and 3D visualizations of Hounsfield values over an axial cross-section of a malignant pulmonary nodule.
Figure 4D:
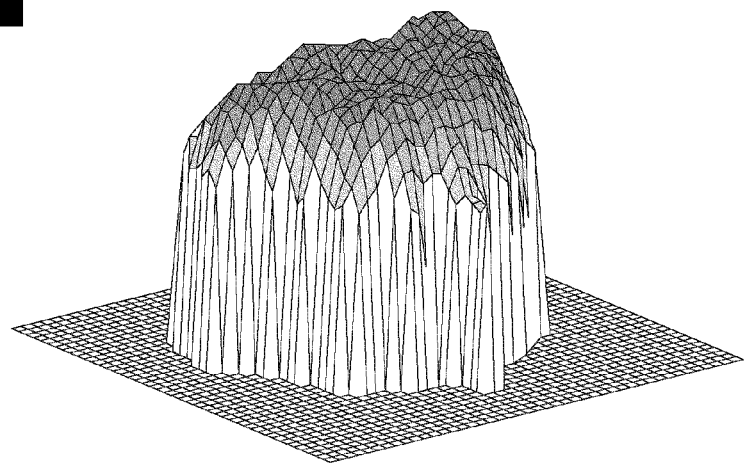

FIGS. 4A-4D present axial cross-sections of two lung nodules suggesting that spatial distribution of the Hounsfield values is much less smooth for a malignant nodule compared to a benign nodule. In particular, FIG. 4A shows a two dimensional visualization and FIG. 4B shows a three dimensional visualization of Hounsfield values over an axial cross-section of a benign nodule, while FIG. 4C shows a two dimensional visualization and FIG. 4D shows a three dimensional visualization of Hounsfield values over an axial cross-section of a malignant nodule.

An MGRF model consistent with the invention describes peculiarities of the visual appearance of the malignant nodules in terms of pairwise spatial co-occurrences of the equalized Hounsfield values.

Let $(x, y, z)$ be Cartesian point coordinates in a 3D lattice $R=[x,y,z]: x=0, \ldots, X-1; y=0, \ldots, Y-1, z=1, \ldots, Z-1]$ supporting 3D images $g=[g_{x,y,z}:(x,y,z) \in R; g_{x,y,z} \in Q]$ with a finite set of intensities $Q=\{0, \ldots, Q-1\}$. The translation and rotation invariant MGRF is specified by a set N of characteristic central-symmetric voxel neighborhoods $\{n_v: v \in N\}$ on R shown in FIGS. 5A and 5B (second-order 2D and 3D, respectively) and a corresponding set $V=(V_v: v \in N)$ of Gibbs potentials, one potential per neighborhood.

The central-symmetric voxel neighborhood $n_v$ embraces all voxel pairs such that the coordinate offsets between any voxel $(x, y, z)$ and its neighbor $(x', y', z')$ belong to an indexed semi-open interval $[d_{v,min}, d_{v,max}); v \in N \subset \{1, 2, 3, \ldots\}$ of the inter-voxel distances:

$$d_{v,min} \leq \sqrt{(x-x')^2 + (y-y')^2 + (z-z')^2} < d_{v,max}. \quad (1)$$

Figure 5A:
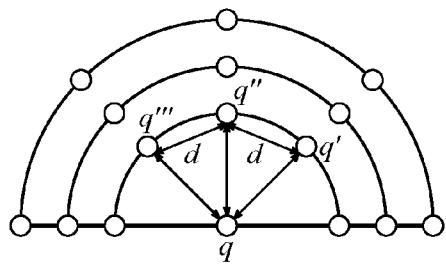
FIGS. 5A and 5B illustrate central-symmetric second-order 2D and 3D neighborhood systems.
Figure 5B:
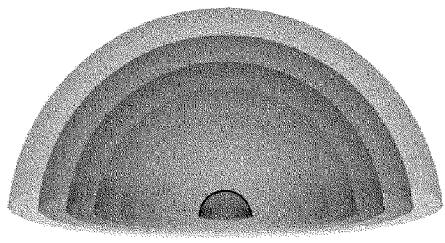

FIGS. 5A and 5B, in particular, illustrate the neighborhoods for distance ranges $d_{v,min}=v-0.5$ and $d_{v,max}=v+0.5$; $v \in N=\{1, \ldots, 4\}$.

Each neighborhood $n_v$ has the same potential function $V_v$ of the absolute intensity difference $\Delta=|q-q'|$ between the neighboring voxel pairs: $V_v=(V_v(\Delta): \Delta \in D)$, where $q=g(x, y, z)$; $q'=g(x', y', z')$ and $D \equiv Q=\{0, 1, \ldots, Q-1\}$. The voxel-wise potential function $V_{vox}=(V_{vox}(q): q \in Q)$ depends on the voxel intensities.

Using an approach such as in G. Gimel'farb, Image Textures and Gibbs Random Fields, Kluwer Academic: Dordrecht, 1999, the potentials may be analytically approximated as:

$$V_v(\Delta) = \lambda(f_v(\Delta) - f_{irf}(\Delta)); v \in N \quad (2)$$

where $f_v(\Delta)$ is the empirical probability of the pairwise intensity difference $(\Delta)$ for the voxel pairs corresponding to the neighborhood $n_v$ over the training data set; $f_{irf}(\Delta)$ denotes the probability of the same difference $(\Delta)$ for the independent random field of equiprobable intensities:

$$f_{irf}(\Delta) = \begin{cases} \frac{1}{Q} & \text{if } \Delta = 0 \\ \frac{2(Q-\Delta)}{Q^2} & \text{otherwise} \end{cases}$$

and the common factor $\lambda$ is also computed analytically. Below it is omitted ($\lambda=1$) because only relative potentials are used for computing relative energies $E_{v,rel}$ of the neighborhoods.

Figure 6A:
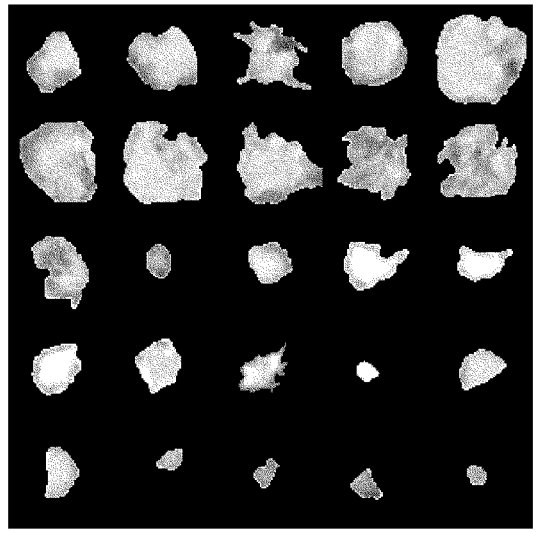

With respect to neighborhood selection, the relative energies:

$$E_{v,rel} = \Sigma_{\Delta \in D} f_v(\Delta)(f_v(\Delta) - f_{irf}(\Delta)) \quad (3)$$

allow for ranking all the available neighborhoods $n_v$ and selecting the characteristic subset N for the prior MGRF appearance model with the potentials of Eq. (2). Examples of typical 2D axial cross-sections of 25 training 3D malignant nodules in FIG. 6A selected from the 50 malignant nodules used for experiments discussed below show how the energies of Eq. (3) vary for the individual central-symmetric neighborhoods $n_v$.

To automatically select the characteristic neighbors, an empirical distribution of the relative energies over a large search set of possible neighbors N can be considered as a mixture $P(E)=\pi P_{lo}(E)+(1-\pi)P_{hi}(E)$ of a wide "non-characteristic" low-energy component and a considerably smaller characteristic high-energy one. Because both the components $P_{lo}(E)$ and $P_{hi}(E)$ can be of arbitrary shape, their mixture including the prior weight $\pi$ is closely approximated with two linear combinations of positive and negative discrete Gaussians using efficient Expectation-Maximization-based algorithms introduced in A. El-Baz and G. Gimel'farb, "EM Based Approximation of Empirical Distributions with Linear Combinations of Discrete Gaussians," Proc. of IEEE International Conference on Image Processing (ICIP'07), San Antonio, Tex., USA, Sep. 16-19, 2007, vol. IV, pp. 373-376.

Figure 7A:
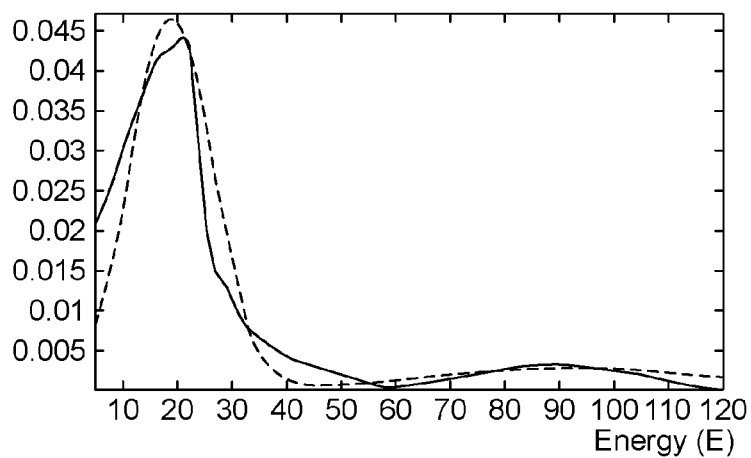
FIGS. 7A-7F are graphs illustrating steps in the calculation of an energy threshold.
Figure 7B:
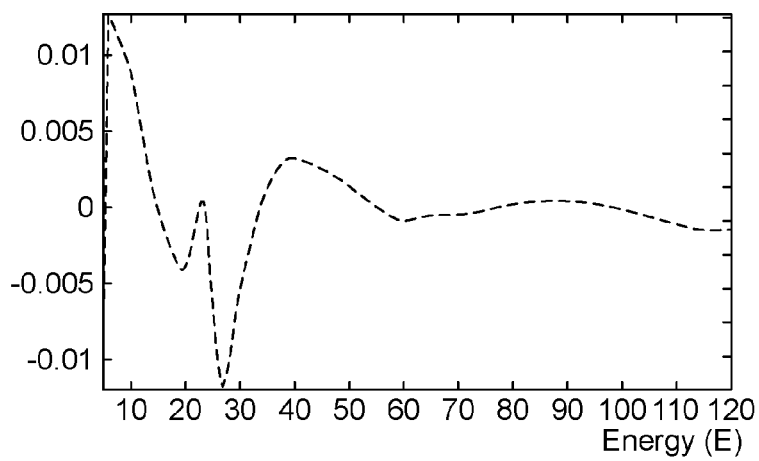
Figure 7C:
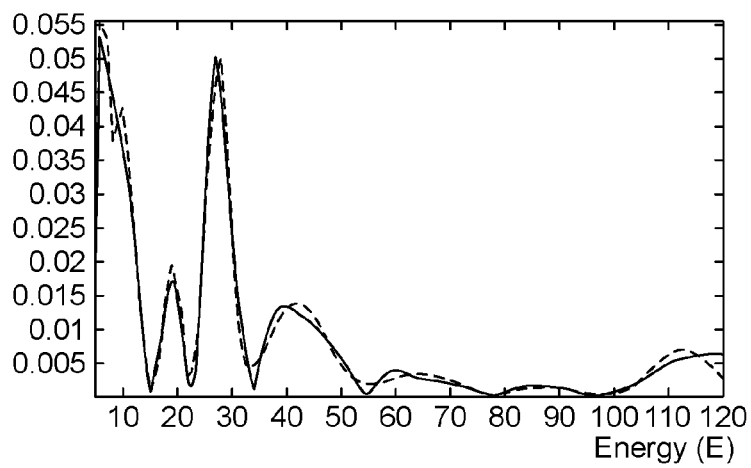
Figure 7D:
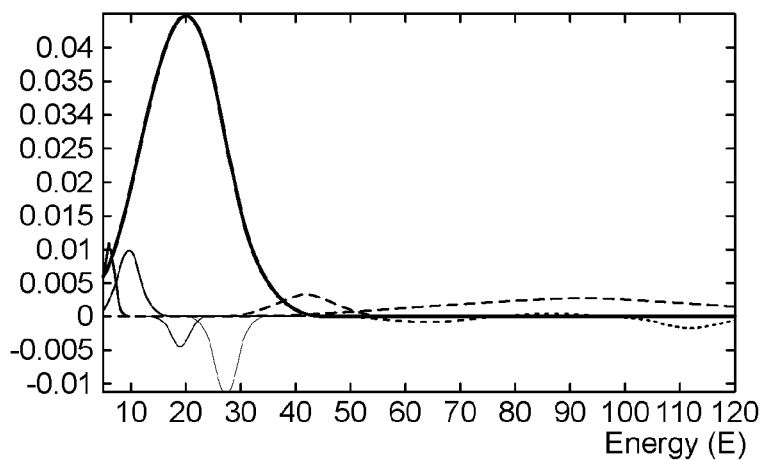
Figure 7E:
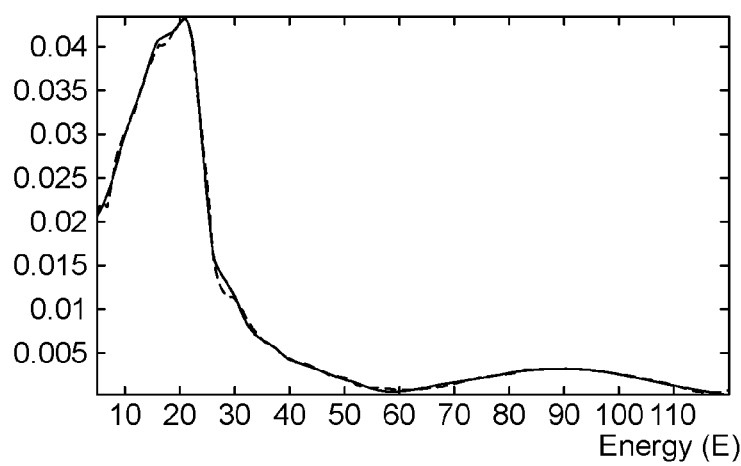
Figure 7F:
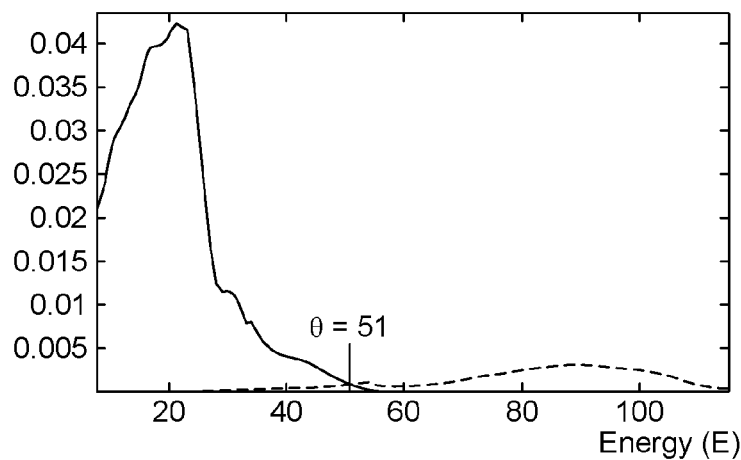

FIGS. 7A-7F, for example, illustrate successive approximation steps. FIG. 7A illustrates an initial approximation of the energy distribution with mixed two dominant Gaussians representing the low and high energies, respectively; FIG. 7B illustrates sign-alternate and absolute deviations between the empirical and estimated mixtures; FIG. 7C illustrates a mixture model for the absolute deviations; FIG. 7D illustrates the resulting positive and negative subordinate components; FIG. 7E illustrates a final approximation of the empirical distribution, and FIG. 7F illustrates two estimated weighed components $\pi P_{lo}(E)$ and $(1-\pi)P_{hi}(E)$.

The intersection of the estimated weighed mixture components provides an energy threshold $\theta$ for selecting the characteristic neighbors: $N=\{v: E_{v,rel} \geq \theta; V \in N\}$. This example results in the threshold $\theta=51$ producing $|N|=8$ characteristic neighbors.

Figure 6B:
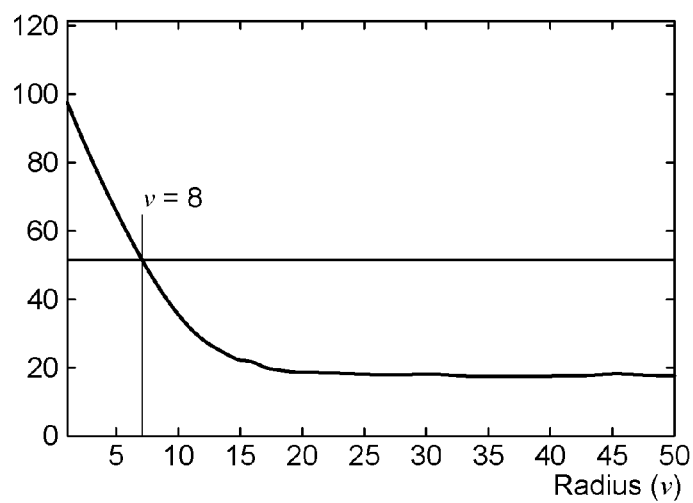
FIG. 6B is a graph of the energies for the voxel neighborhoods at different radii in the training nodules of FIG. 6A.

Under the model learned, any nodule image g is described by its total Gibbs energy:

$$E(g) = V_{vox}^T F_{vox}(g) + \Sigma_{v \in N} \rho_v V_v^T F_v(g) \quad (4)$$

where N is a set of the selected neighbors, $F_{vox}(g)$ and $F_v(g)$ are vectors of the empirical probability distributions of intensities and absolute intensity differences collected within the nodule in g, and $\rho_v$ denotes a relative cardinality of the set of all the voxel pairs corresponding to the neighborhood v with respect to the lattice cardinality X Y Z. FIG. 6B illustrates energies of Eq. (4) for the voxel neighborhoods $N=\{n_v: v \leq 50\}$, in the training nodules illustrated in FIG. 6A.

Working Example

To justify the proposed methodology of learning the 3D appearance (i.e. spatial distribution of Hounsfield values) of both malignant and benign nodules after normalizing the image signals, the above appearance analysis was pilot-tested on a database of clinical multislice 3D chest LDCT scans of 109 lung nodules (51 malignant nodules and 58 benign nodules). The scanned CT data sets have each $0.7 \times 0.7 \times 2.0$ mm³ voxels, the diameters of the nodules ranging from 3 mm to 30 mm.

Figure 8A:
FIGS. 8A-8I illustrate the appearance analysis of malignant nodules, where
Figure 8B:
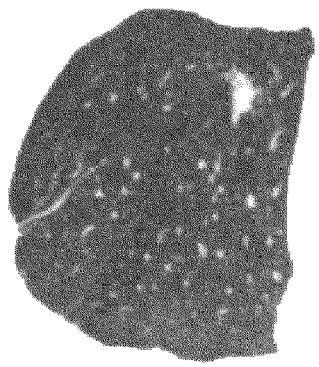
Figure 8C:
Figure 8D:
Figure 8E:
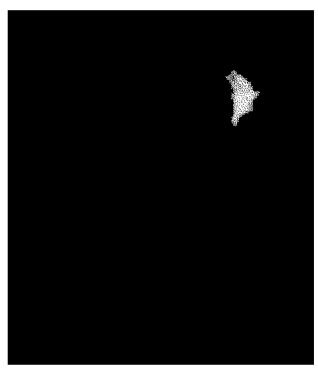
Figure 8F:
Figure 8G:
Figure 8H:
Figure 8I:
Figure 9A:
FIGS. 9A-9I illustrate the appearance analysis of benign nodules, where
Figure 9B:
Figure 9C:
Figure 9D:
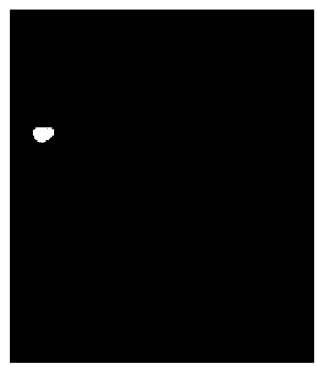
Figure 9E:
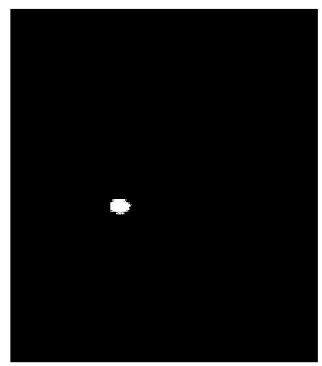
Figure 9F:
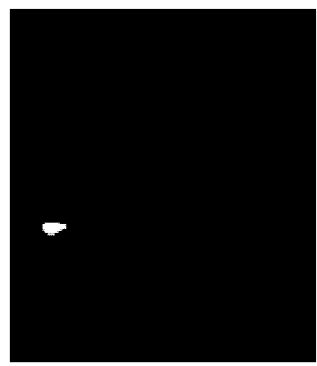
Figure 9G:
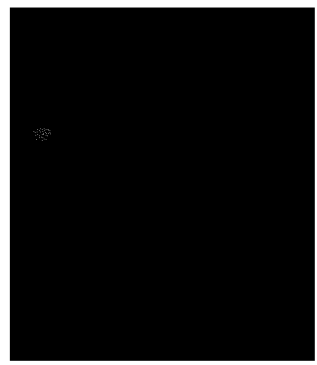
Figure 9H:
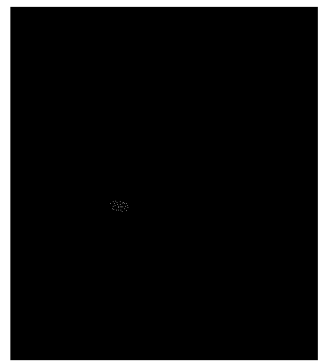
Figure 9I:
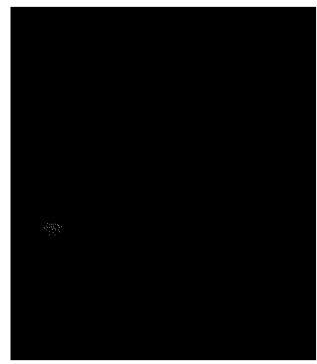

FIGS. 8A-8I and 9A-9I respectively show the conditional voxel-wise Gibbs energies describing the 3D appearance of both malignant (FIGS. 8A-8I) and benign (FIGS. 9A-9I) pulmonary nodules. FIGS. 8A, 8B and 8C illustrate original LDCT images of a lung taken in axial (FIG. 8A), saggital (FIG. 8B) and coronal (FIG. 8C) planes. FIGS. 8D, 8E and 8F illustrate image data of nodules segmented with the method described in the aforementioned article entitled "Appearance models for robust segmentation of pulmonary nodules in 3D LDCT chest images," taken in axial (FIG. 8D), saggital (FIG. 8E) and coronal (FIG. 8F) planes. FIGS. 8G, 8H and 8I illustrate grey-coded conditional voxel-wise Gibbs energies for the aforementioned learned MGRF model, taken in axial (FIG. 8G), saggital (FIG. 8H) and coronal (FIG. 8I) planes. FIGS. 9A-9I correspond to FIGS. 8A-8I, but for a benign pulmonary nodule.

It should be evident from these figures that the Gibbs energy for the malignant nodules is higher than the Gibbs energy for the benign nodules because slow variations of the voxel intensities for the latter makes their absolute differences close to zero. Contrastingly, the intensity variations in the voxels in malignant nodules make the absolute differences for two neighboring voxels much greater than zero. Shown in FIG. 10 probability distributions of the Gibbs energy in Eq. (4) describing the 3D appearance of 25 malignant and 29 benign nodules were obtained by the close approximation of the empirical mixture using the approach in the aforementioned article entitled "EM Based Approximation of Empirical Distributions with Linear Combinations of Discrete Gaussians."

The training subset for classification (25 malignant and 29 benign nodules) was arbitrarily selected among all of the 109 lung nodules. The classification accuracy of a Bayes classifier using the estimated probability models in FIG. 10 was evaluated using the $\chi^2$-test at the three confidence levels—85%, 90% and 95%—in order to examine significant differences in the Gibbs energy. As expected, the 85% confidence level yielded the best results—correctly classifying 26 out of 26 malignant nodules (100% accuracy), and 29 out of 29 benign nodules (100% accuracy). At the 90% confidence level, 26 out of 26 malignant nodules and 29 out of 29 benign nodules (100% accuracy) were still classified correctly. The 95% confidence level gave smaller accuracy rates for both groups, namely, 24 out of 26 correct answers for the malignant nodules (92%) and still 29 out of 29 benign nodules (100%).

Classification Using Learned Appearance Model

Figure 11:
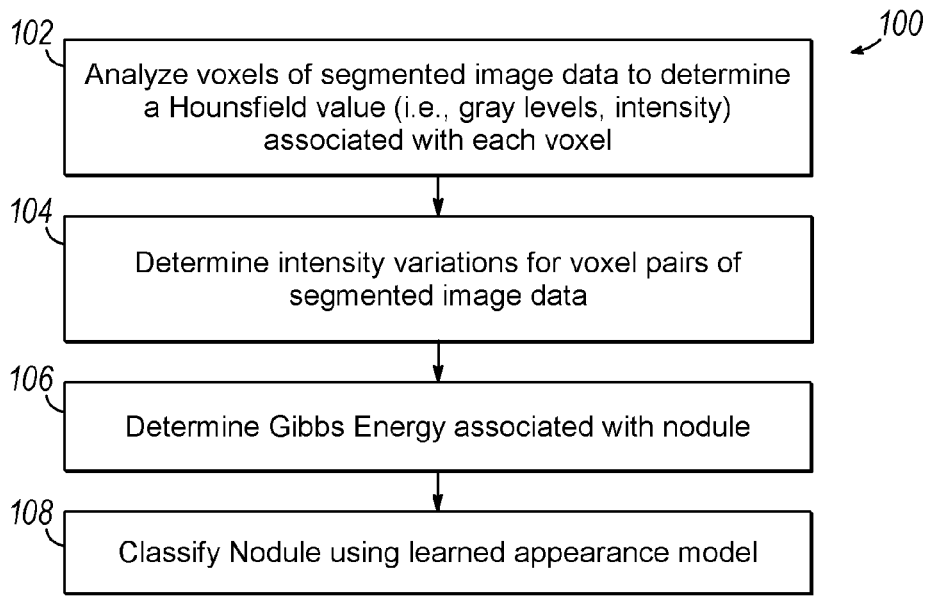
FIG. 11 is a flowchart illustrating a sequence of operations that may be performed by the apparatus of FIG. 3 to classify a pulmonary nodule by analyzing image data associated with the pulmonary nodule consistent with embodiments of the invention.

Turning now to FIG. 11, a flowchart 100 is provided which illustrates a sequence of operations that may be performed by one or more processing units of one or more computers consistent with some embodiments of the invention to classify a pulmonary nodule using a learned appearance model. Voxels included in segmented image data associated with the pulmonary nodule may be analyzed to determine a Hounsfield value (i.e., an intensity) for each voxel (block 102). In some embodiments, a voxel may include data indicating a grey level value which may correspond to the Hounsfield value. As described herein, an intensity variation between neighboring voxels of the image data associated with the pulmonary nodule may be determined (block 104). In some embodiments, a voxel neighborhood may be determined, including for example, using Eq. (1), and an intensity difference between neighboring voxels may be determined. A Gibbs energy may be determined for the pulmonary nodule based on the determined intensity variations (block 106).

In some embodiments, the Gibbs energy may be determined, including for example using Eq. (4). The pulmonary nodule may be classified as malignant or benign by using a learned appearance model consistent with embodiments of the invention (block 108). In some embodiments, the classification of the pulmonary nodule may be based at least in part on the Gibbs energy associated with the pulmonary nodule. For example, referring to the exemplary energy probability model illustrated in FIG. 10, the determined Gibbs energy associated with the pulmonary nodule may be compared to the exemplary learned appearance model of FIG. 10 to thereby classify the pulmonary nodule as malignant or benign.

Figure 10:
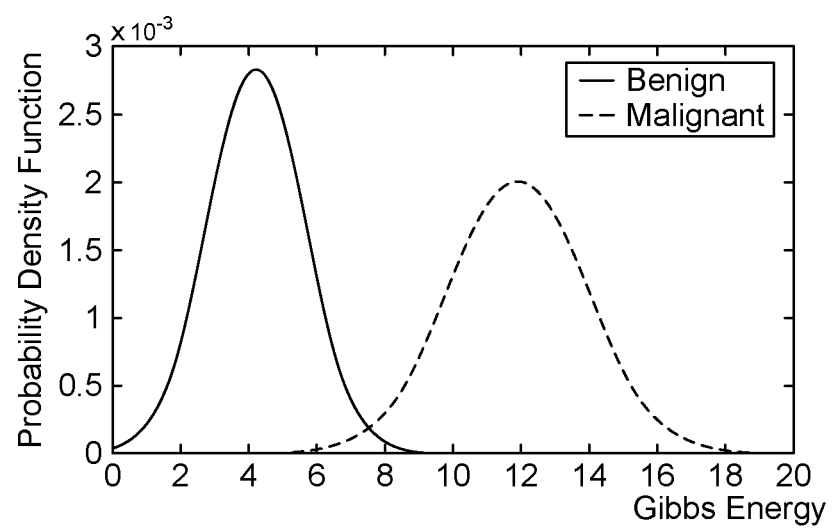
FIG. 10 is a graph of energy probability models describing the appearance of 3D malignant and benign nodules obtained using modeling techniques consistent with the invention.

While classification of a pulmonary nodule is discussed using exemplary learned appearance model of FIG. 10 which illustrates an exemplary learned appearance model including an energy probability model, the invention is not so limited. For example in some embodiments, a learned appearance model may model one or more characteristics that may be determined based on the appearance of pulmonary nodules, including for example, Gibbs energy, intensity variations, relative energies, potential energies, Hounsfield values, and other such appearance characteristics.

Generation of Learned Appearance Model

Figure 12:
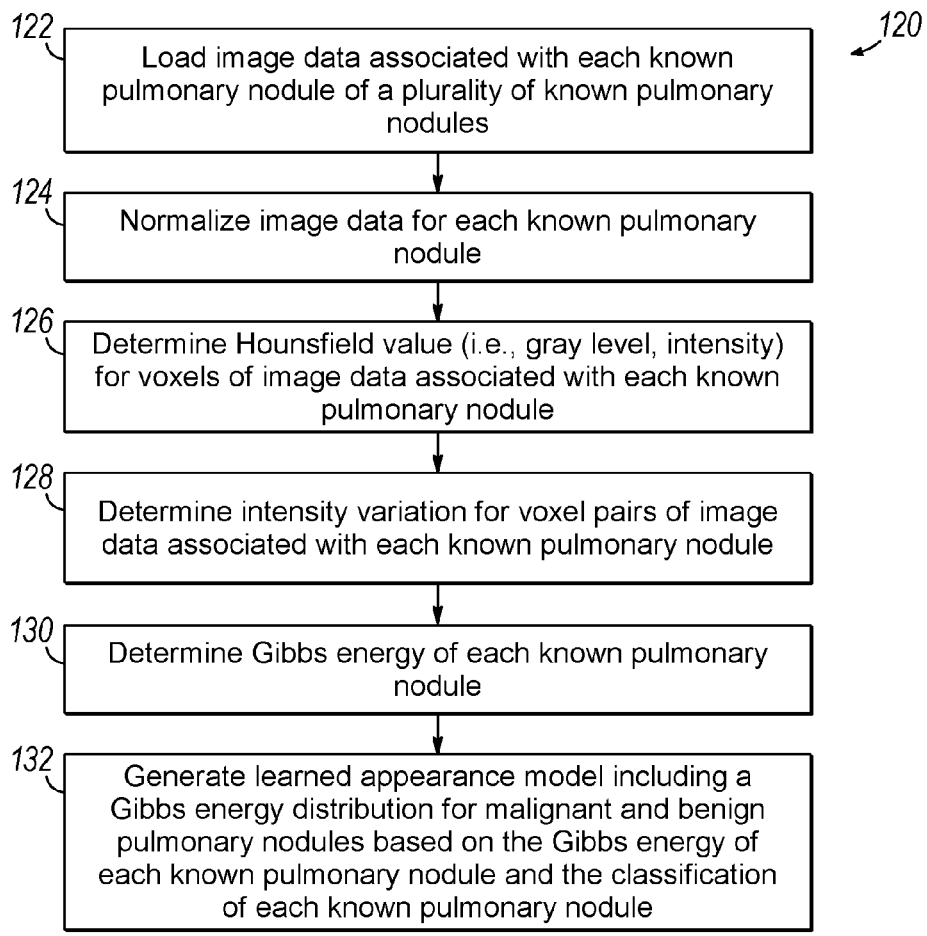
FIG. 12 is a flowchart illustrating a sequence of operations that may be performed by the apparatus of FIG. 3 to generate a learned appearance model by analyzing image data associated with one or more known pulmonary nodules.

Referring to FIG. 12, a flowchart 120 is provided, which illustrates a sequence of operations that may be performed by one or more processing units and one or more computers consistent with embodiments of the invention to generate a learned appearance model for classifying pulmonary nodules based on one or more characteristics that may be determined based on the appearance of pulmonary nodules. Image data associated with known pulmonary nodules may be loaded and/or received at a computer (block 122). A known pulmonary nodule indicates that the pulmonary nodule has been classified as either benign or malignant, and in some embodiments, the image data associated with a particular known pulmonary nodule may indicate the classification of the particular known pulmonary nodule. The image data for each known pulmonary nodule may be normalized as described above prior to analysis (block 124). Hounsfield values may be determined for voxels included in the image data associated with each known pulmonary nodule (block 126). In some embodiments, each voxel may include data indicating a gray-level associated with the voxel, and the gray level may indicate a Hounsfield value associated with the voxel, where the Hounsfield value may be referred to as an intensity value. An intensity variation between neighboring voxels (i.e., voxel pairs) of image data associated with each known pulmonary nodule may be determined (block 128), and a Gibbs energy may be determined for each known pulmonary nodule based at least in part on intensity variations for voxel pairs associated with the particular pulmonary nodule (block 130). A learned appearance model may be generated based at least in part on the determined Gibbs energy of each known pulmonary nodule and the classification of each known pulmonary nodule (block 132). The learned appearance model may be an energy probability model which describes the appearance of known pulmonary nodules, such as, for example the exemplary learned appearance model provided at FIG. 10.

As such, embodiments of the invention may determine one or more appearance characteristics of a plurality of known pulmonary nodules to determine an appearance value associated with each known pulmonary nodule, and a learned appearance model may be generated based on the determined appearance values and the classification of each known pulmonary nodule. The learned appearance model may be utilized to classify a particular pulmonary nodule based on the one or more appearance characteristics by analyzing an appearance value based on the one or more appearance characteristics of the particular pulmonary nodule to the learned appearance model and the appearance values associated with the known pulmonary nodules.

CONCLUSION

Embodiments of the invention therefore rely on using the appearance of a segmented 3D nodule instead of growth rate as a reliable diagnostic feature. The appearance is described in terms of voxel-wise conditional Gibbs energies for a generic rotation and translation invariant second-order MGRF model of malignant nodules with analytically estimated characteristic voxel neighborhoods and potentials.

It is believed that the herein-described nodule appearance analysis may lead in some instances to more accurate and clinically useful fast diagnostics of detected pulmonary nodules without the need for investigating their temporal development on the successive LDCT images of the same subject collected for a relatively long time. However, it will be appreciated that embodiments of the invention may also utilize growth rate in combination with the aforementioned learned appearance model in order to detect malignant pulmonary nodules.

Other modifications will be apparent to one of ordinary skill in the art. Therefore, the invention lies in the claims hereinafter appended.

What is claimed is:

1. A method of classifying a pulmonary nodule, the method comprising:
   receiving image data associated with a chest scan;
   segmenting image data associated with lung tissue from the image data associated with the chest scan;
   equalizing the segmented image data;
   segmenting image data associated with a pulmonary nodule from the equalized and segmented image data; and
   classifying the pulmonary nodule as benign or malignant by applying a learned appearance model to pulmonary nodule image data for the pulmonary nodule from the segmented image data associated with the pulmonary nodule, wherein the learned appearance model is based upon visual appearances of a plurality of known pulmonary nodules and models voxel-wise conditional Gibbs energies, wherein classifying the pulmonary nodule as benign or malignant includes determining an intensity variation between voxels within the pulmonary nodule image data, and classifying the pulmonary nodule as benign or malignant based at least in part on the determined intensity variation.

2. The method of claim 1, wherein the learned appearance model comprises a generic rotation and translation invariant second-order Markov Gibbs Random Field (MGRF) model of malignant nodules with analytically estimated characteristic voxel neighborhoods and potentials.

3. The method of claim 2, wherein classifying the pulmonary nodule as benign or malignant includes determining a Gibbs energy associated with the pulmonary nodule based on the intensity variation between voxels within the pulmonary nodule image data, and classifying the pulmonary nodule as benign or malignant based at least in part on the determined Gibbs energy.

4. The method of claim 1, wherein determining the intensity variation between voxels within the pulmonary nodule image data includes determining an intensity variation between pairs of voxels of a plurality of voxels included in the segmented image data associated with the pulmonary nodule.

5. The method of claim 4, wherein the intensity variation is based at least in part on a gray level associated with each voxel of a neighborhood of voxels, and wherein the gray level associated with each voxel corresponds to a Hounsfield value associated with the voxel.

6. The method of claim 1, wherein the segmented image data associated with the pulmonary nodule includes data indicating a Hounsfield value for each voxel of a plurality of voxels associated with the pulmonary nodule, and wherein classifying the pulmonary nodule as benign or malignant is based at least in part on variances in Hounsfield values between voxel pairs of the plurality of voxels associated with the pulmonary nodule.

7. The method of claim 6, wherein classifying the pulmonary nodule as benign or malignant by applying a learned appearance model to the segmented image data associated with the pulmonary nodule includes determining a Gibbs energy associated with the pulmonary nodule based on the variance in Hounsfield values between voxels of the voxel pairs associated with the pulmonary nodule.

8. An apparatus, comprising:
   at least one processor; and
   program code configured to be executed by the at least one processor to classify a pulmonary nodule as benign or malignant by applying a learned appearance model to pulmonary nodule image data for the pulmonary nodule, wherein the learned appearance model is based upon visual appearances of a plurality of known pulmonary nodules and models voxel-wise conditional Gibbs energies, wherein the program code is further configured to determine intensity variation between voxels within the pulmonary nodule image data, and wherein the program code is configured to classify the pulmonary nodule as benign or malignant based at least in part on the determined intensity variation.

9. A program product, comprising:
   a non-transitory computer readable storage medium; and
   program code stored on the non-transitory computer readable storage medium and configured upon execution to classify a pulmonary nodule as benign or malignant by applying a learned appearance model to pulmonary nodule image data for the pulmonary nodule, wherein the learned appearance model is based upon visual appearances of a plurality of known pulmonary nodules and models voxel-wise conditional Gibbs energies, wherein the program code is further configured to determine intensity variation between voxels within the pulmonary nodule image data, and wherein the program code is configured to classify the pulmonary nodule as benign or malignant based at least in part on the determined intensity variation.

10. A method of generating a learned appearance model for classifying pulmonary nodules as benign or malignant, comprising:
   normalizing image data associated with a plurality of known pulmonary nodules; and
   processing the normalized image data to learn a 3D appearance of the plurality of known pulmonary nodules to generate the learned appearance model, wherein the learned appearance model comprises an energy probability model that models voxel-wise conditional Gibbs energies of a plurality of known benign and malignant pulmonary nodules for use in classifying unknown pulmonary nodules as benign or malignant.

11. The method of claim 10, wherein processing the normalized image data includes learning a spatial distribution of Hounsfield values of the known pulmonary nodules.

12. The method of claim 11, wherein processing the normalized image data includes learning a distribution of Hounsfield values of known malignant and benign pulmonary nodules.

13. The method of claim 10, wherein the learned appearance model comprises a generic rotation and translation invariant second-order Markov Gibbs Random Field (MGRF) model of malignant nodules with analytically estimated characteristic voxel neighborhoods and potentials.

14. The method of claim 10, wherein the normalized image data includes data indicating a plurality of voxels associated with each known pulmonary nodule, wherein each voxel includes data indicating an associated intensity value and wherein processing the normalized image data to learn a 3D appearance of the plurality of known pulmonary nodules to generate the learned appearance model includes analyzing the plurality of voxels associated with each known pulmonary nodule to determine an intensity difference between at least a portion of the voxels associated with each known pulmonary nodule.

15. The method of claim 14, wherein processing the normalized image data to learn a 3D appearance of the plurality of known pulmonary nodules to generate the learned appearance model includes determining a Gibbs energy value associated with each known pulmonary nodule based at least in part on the intensity values of voxels associated with each known pulmonary nodule.

* * * * *